United States Patent
Hunter

(10) Patent No.: US 10,240,352 B1
(45) Date of Patent: Mar. 26, 2019

(54) CROSSHEAD STRUCTURE

(71) Applicant: Al Hunter, Raleigh, NC (US)

(72) Inventor: Al Hunter, Raleigh, NC (US)

(*) Notice: Subject to any disclaimer, the term of this patent is extended or adjusted under 35 U.S.C. 154(b) by 0 days.

(21) Appl. No.: 15/260,672

(22) Filed: Sep. 9, 2016

Related U.S. Application Data

(60) Continuation of application No. 14/846,107, filed on Sep. 4, 2015, now Pat. No. 9,464,446, which is a division of application No. 13/962,409, filed on Aug. 8, 2013, now Pat. No. 9,127,465.

(51) Int. Cl.
| | | |
|---|---|---|
| *E04F 19/02* | (2006.01) | |
| *B29C 45/00* | (2006.01) | |
| *B29D 12/00* | (2006.01) | |
| *B29K 27/06* | (2006.01) | |
| *B29L 31/00* | (2006.01) | |

(52) U.S. Cl.
CPC ............ *E04F 19/02* (2013.01); *B29C 45/006* (2013.01); *B29D 12/00* (2013.01); *B29K 2027/06* (2013.01); *B29L 2031/005* (2013.01)

(58) Field of Classification Search
CPC ... E04F 19/0495; E04F 19/0436; E04F 19/00; E04F 19/005; E04F 19/02; B29L 2031/005
See application file for complete search history.

(56) References Cited

U.S. PATENT DOCUMENTS

| | | |
|---|---|---|
| 254,868 A | 3/1882 | Gudgeon |
| 405,232 A | 6/1889 | Symonds |
| 420,775 A | 2/1890 | Dambach |
| 827,369 A | 7/1906 | Holbein et al. |
| 1,683,168 A | 9/1928 | Dambach |
| 2,080,555 A | 5/1937 | Beil et al. |
| RE21,001 E | 2/1939 | Beil et al. |
| 2,342,893 A | 2/1944 | Purcell et al. |
| 3,778,945 A | 12/1973 | Medow |
| 4,254,596 A | 3/1981 | Wright et al. |
| 4,805,591 A | 2/1989 | Pitha |
| 5,042,549 A | 8/1991 | Roberts |
| 5,119,603 A | 6/1992 | Jones |
| 5,179,811 A | 1/1993 | Walker et al. |
| 5,465,539 A | 11/1995 | Rose |
| 5,597,025 A | 1/1997 | Forkner |
| 5,787,667 A | 8/1998 | Sheahan et al. |
| 6,315,026 B1 | 11/2001 | Ross |
| 6,643,990 B2 | 11/2003 | Jensen |
| 6,715,724 B2 | 4/2004 | Wells et al. |
| 6,725,614 B2 | 4/2004 | Schiedegger et al. |
| 6,837,020 B1 | 1/2005 | Keddell |
| 7,063,121 B2 | 6/2006 | Zorbas et al. |
| 7,210,272 B2 | 5/2007 | Friday |
| 7,748,179 B2 | 7/2010 | Schiedegger et al. |
| 7,784,233 B2 | 8/2010 | Friedlich |
| 8,056,290 B2 | 11/2011 | Schiedegger et al. |
| 8,375,660 B2 | 2/2013 | Nolan et al. |
| 8,534,012 B2 | 9/2013 | Wood |
| 2005/0198914 A1 | 9/2005 | Lyons et al. |

(Continued)

*Primary Examiner* — Jessica L Laux
(74) *Attorney, Agent, or Firm* — Middleton Reutlinger

(57) ABSTRACT

A universal crosshead structure having a first member and a second member. The crosshead structure may be reconfigured from a first length to a second length to fit a variety of applications. Each one of the first and second members may include a severable portion. The crosshead structure may include a trim and a head piece disjointed among the first and second members.

9 Claims, 3 Drawing Sheets

(56) References Cited

U.S. PATENT DOCUMENTS

| | | |
|---|---|---|
| 2005/0210784 A1 | 9/2005 | Hahn |
| 2007/0044400 A1 | 3/2007 | Bunner et al. |
| 2007/0199260 A1 | 8/2007 | Jensen |
| 2008/0163985 A1 | 7/2008 | MacKaig |

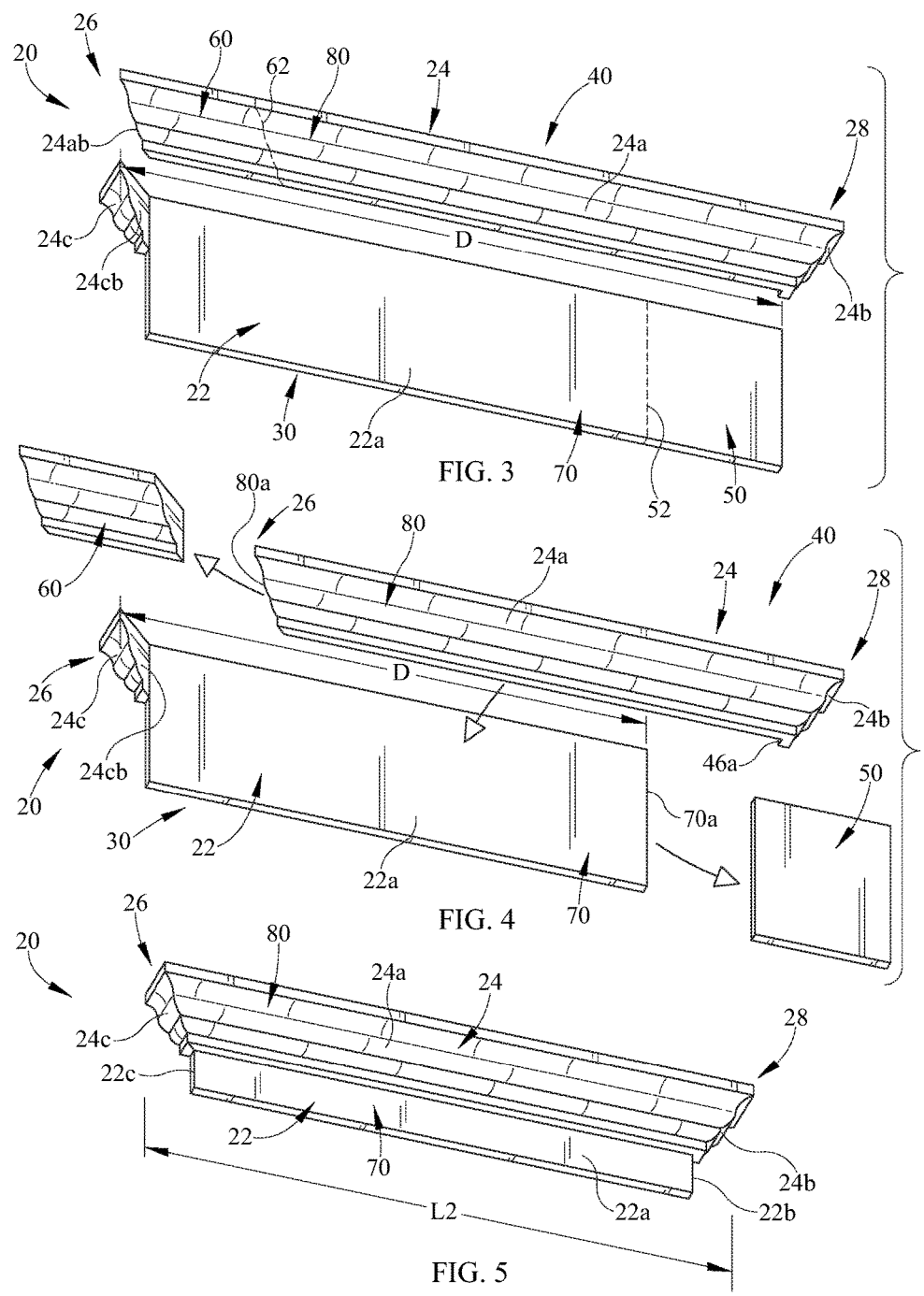

CROSSHEAD STRUCTURE

TECHNICAL FIELD

The present invention relates to architectural construction materials and more particularly to a crosshead structure.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 3 is a perspective view of the crosshead structure of FIG. 1 illustrating one embodiment as formed;

FIG. 4 is a perspective view of the crosshead structure of FIG. 3 illustrating the severable portions exploded away from their respective remaining members;

FIG. 5 is a perspective view of the crosshead structure of FIG. 4 illustrating the assembled crosshead with a second or smaller length.

DETAILED DESCRIPTION

Figure 1:
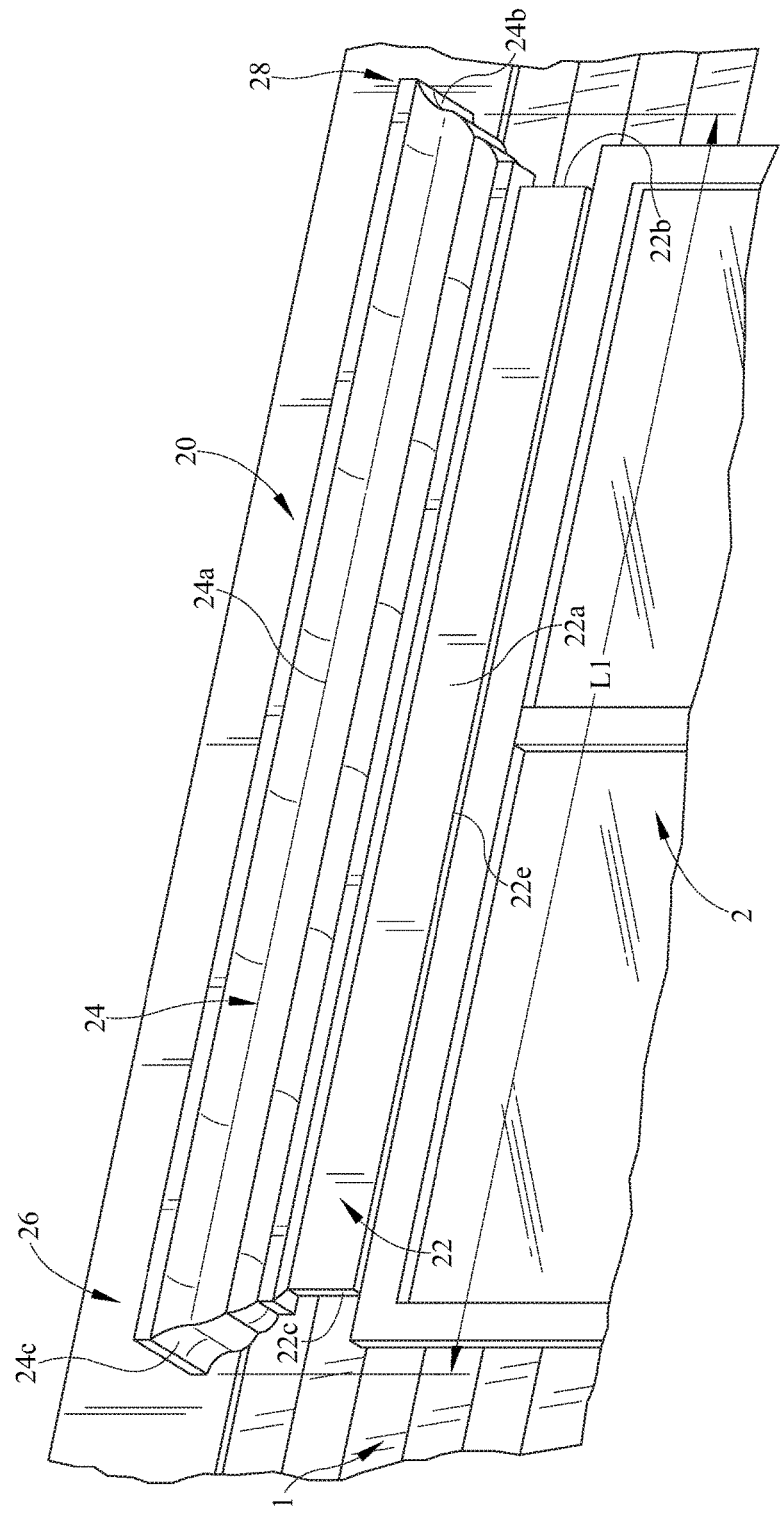
FIG. 1 is a perspective view of a crosshead structure according to one embodiment positioned above a window, with portions of the building broken away.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative embodiments are possible.

Figure 2:
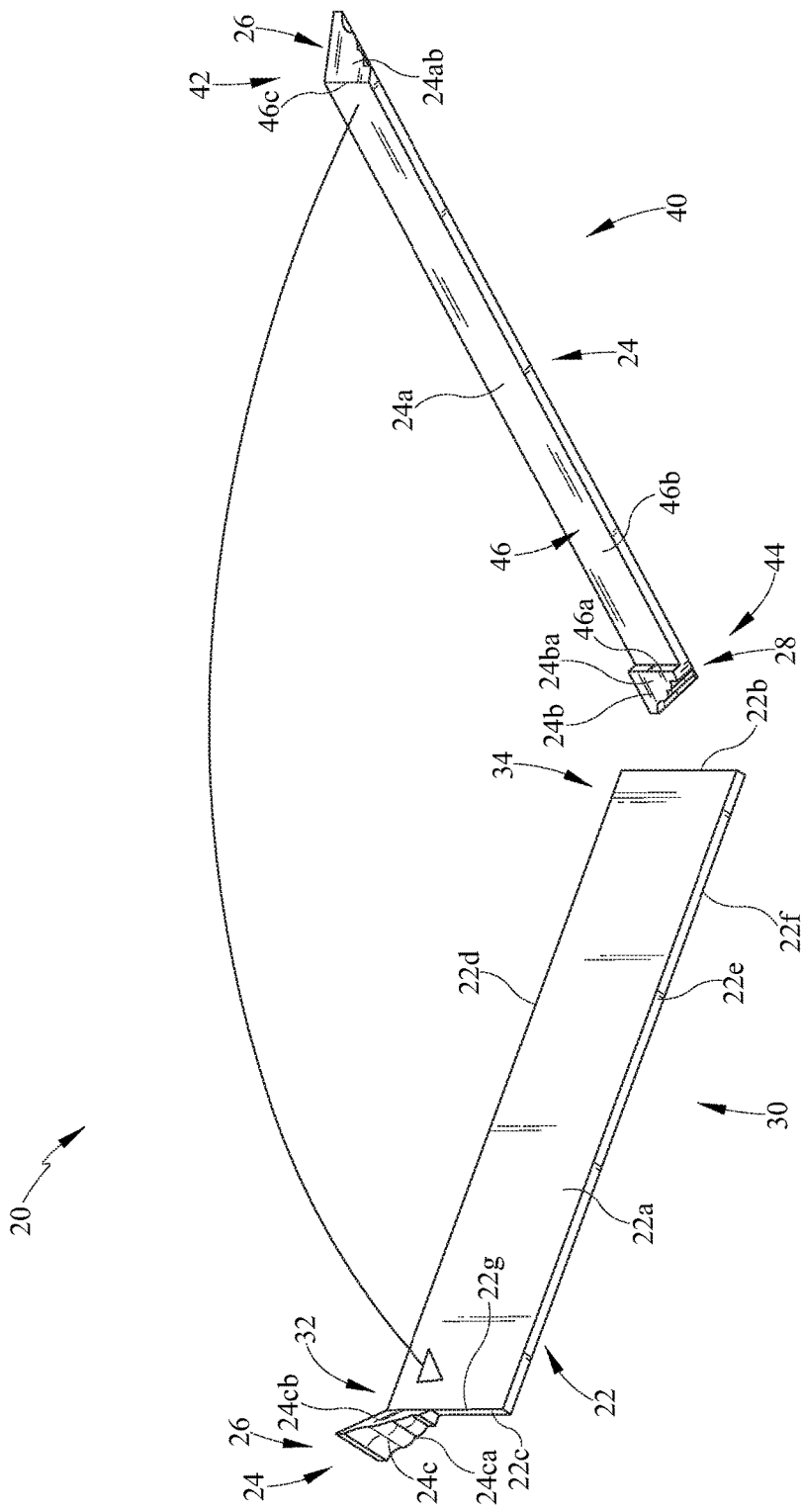
FIG. 2 is a perspective view of the crosshead structure of FIG. 1, with the members of the crosshead exploded away from each other.

As shown in FIG. 1, a building 1 contains a window 2 that includes at least one embodiment of a crosshead structure 20. Applications of the crosshead 20 may include, but are not limited to, a window, a garage, or door. Such descriptions or positions of possible applications are not considered to be limiting. Crosshead 20 is resizable to fit a variety of applications or lengths. Crosshead 20 is formed as shown in FIGS. 1-3 to be of a first length or configuration L1 and then may be resized or configured to a second length or configuration L2 as shown in FIG. 5, with the first length L1 being larger than the second length L2. As such, the user may be able to manipulate the universal crosshead 20 into one or more desired applications. Although the crosshead 20 is shown in detail in the drawings, it is merely representative of one embodiment, and it is to be understood that there are a variety of shapes, sizes, orientations, constructions, and quantities which may be used and still be within the scope of the teachings herein.

As shown in FIGS. 1-5, crosshead 20 may be a two component structure or molded member having a first member 30 and a second member 40. The first member 30 and second member 40 are formed or molded separately (FIGS. 2 and 3) in a disengaged position and subsequently combined or overlapped to form the assembled crosshead 20 (FIGS. 1 and 5) in an engaged position. The assembled crosshead 20 may include a head piece 22 with a decorative trim, molding, or cap 24 extending for a length about its outer peripheral surfaces. The trim 24 may be positioned adjacent the top surface or upper edge 22d of the head piece 22. As illustrated, the trim 24 extends across the front side 22a and lateral sides 22b and 22c or surfaces of the head piece 22 thus creating two corners, a first corner 26 and second corner 28, at respective longitudinal ends of the crosshead 20. The trim 24 may include a center cap 24a interconnecting a first end cap 24c and a second end cap 24b. Although the trim 24 and head piece 22 are shown in detail in the drawings, it is merely representative of one embodiment, and it is to be understood that there are a variety of shapes, sizes, orientations, constructions, and quantities which may be used and still be within the scope of the teachings herein. For instance, the trim 24 and head piece 22 may be a variety of desired profiles, patterns, positions relative to each other, and appearances not limited to the embodiment shown in the figures. Further, each corner may be a variety of shapes, sizes, orientations, constructions, and quantities which may be used and still be within the scope of the teachings herein.

As depicted in FIGS. 2 and 3, each member 30 and 40 of crosshead 20 is of a unitary construction and is integrally formed by standard injection molding techniques known in the art of a PVC or similar material. However, the choice of manufacture is not deemed to be limiting. Each crosshead member 30 and 40 is made of one or more materials commonly known in the art depending on specific product and environmental conditions. Alternatively stated, materials may be readily available for use in the construction industry. Some common examples of materials include, but are not limited to, fiberglass, fiber-reinforced plastic, polypropylene, polyurethane, and urethane. The choice of materials described herein is not deemed to be limiting. Manufacturing each crosshead member 30 and 40 may include pouring or injecting one or more materials into one or more mold cavities. Further, flashing or other excess materials may be removed from the crosshead member upon removal from the mold cavities. A primer coating and/or paint may be applied to the crosshead member as well.

As shown more clearly in FIGS. 2-4, the first member 30 of crosshead 20 may include the elongated head piece 22 and first end cap 24c. Further, the first member 30 may include a portion of the first corner 26 or trim. More specifically shown, head piece 22 may be a substantially planar member with a top surface 22d and bottom surface 22e interconnected by the outer peripheral surfaces that includes at least the front surface 22a and opposing lateral surfaces 22b and 22c. The first end cap 24c or trim portion extends from a first end 32 of the head piece 22 or more specifically the lateral surface 22c adjacent the top surface 22d or an upper edge of the head piece 22. A rear side 24ca of the first end cap 24c is substantially flush with the rear surface 22f of the head piece 22. The first end cap 24c extends in a direction outwardly from the front surface 22a of the head piece 22. A front or angled surface 24cb faces towards the front surface 22a or second end 34 of the head piece 22 or first member 30. The first end cap 24c tapers from the top surface 22d towards the bottom surface 22e. Angled surface 24cb extends from an outer peripheral edge 22g between front surface 22a and lateral surface 22c of the head piece 22. The angled surface 24cb may be positioned at about 135 degrees from the plane of the head piece front surface 22a, or alternatively stated about 135 degrees from the lateral surface 22c. It is understood that the angle of the corners or connections between trim 24 may vary from that which is illustrated in the figures.

As shown more clearly in FIGS. 2-4, the second member 40 may include the remainder of the trim 24 that may include the center cap 24a and a second end cap 24b. Further, second member 40 includes the second corner 28 and a portion of the first corner 26. The center cap 24a or second member 40 includes a first end 42 and a second end 44, with the second end cap 24b adjacent the second end 44. The first end 42 of the center cap 24a may include an angled surface 24ab coinciding or engaging with the angled surface 24cb of the first end cap 24c when assembled (FIG. 1). As a result, the center cap 24a of the trim 24 interconnects the first end cap 24c and second end cap 24b to create the trim 24 when assembled. The angled surface 24ab faces towards a rear surface 24ba of the second end cap 24b. Further, the second member 40 may include a recess 46 spaced from the rear surface 24ba of the second end cap 24b. The recess 46 receives or engages the head piece 22 of the first member 30 when assembled. More specifically a recess abutment surface 46a engages a portion of the lateral surface 22b of the second end 34 of the first member 30 while the remainder or bottom surface 46b of the recess 46 overlaps or engages the head piece 22 when assembled (FIG. 1). As such, head piece front surface 22a faces and engages bottom surface 46b. Angled surface 24ab extends from an outer peripheral edge 46c of the recess bottom surface 46b at the first end 42 of the center cap 24a. The angled surface 24ab may be positioned at about 135 degrees from the plane of the bottom surface 46b, or alternatively stated about 45 degrees to combine with the first end cap 24c with its 45 degree angled surface 24cb to create a 90 degree first corner 26.

If desired for a particular application, each of the first member 30 and second member 40 may need to be reduced in length to configure the crosshead 20 from a first length L1 (FIGS. 1-3) to a smaller second length L2 (FIGS. 4 and 5). Each of the first member 30 and second member 40 will have a severable portion, 50 and 60 respectively, from one end, more specifically the end opposite from their respective end cap 24c and 24b in order to remove a desired portion of varying lengths from each member. Stated alternatively, the severable portions 50 and 60 are removed from opposing ends of the crosshead 20 to create the desired overall length or remaining portions 70 and 80 of their respective member. For example when reducing the length of the first member 30, the severable portion 50 will be removed from the remaining portion 70 or second end 34 along a first cut line or line of demarcation 52. The severable portion 50 of the first member 30 includes a portion of the head piece 22 or more specifically the second end 34 of the head piece 22 opposite the first end cap 24c. The first cut line 52 may be made substantially perpendicular to the axis along the length of the first member 30 to create the cut lateral surface 70a. At least a portion of the remaining portion 70 of the head piece 22 or cut lateral surface 70a will be hidden or concealed when engaging the recess abutment surface 46a of the second member 40. The length of the second member 40 may be reduced by removing the severable portion 60 from the remaining portion 80 or first end 42 along a second cut line or line of demarcation 62. Stated alternatively, the severable portion 60 may be removed from the end opposite the second corner 28 along the second cut line 62. The severable portion 60 of the second member 40 includes a portion of the center cap 24a, or stated alternatively a portion of the first corner 26. The second cut line 62 may be made transversely at an angle resulting in a cut angled surface 80a of the first end 42 that coincides to the angled surface 24cb of the first end cap 24c. The cut angle and resulting angled surface 80a may be at about 45 degrees or transverse to the longitudinal axis of the second member 40. The cut angled surface 80a or the first end 42 of the remaining center cap 24a made from the second cut line 62 will be substantially hidden or concealed when engaging the angled surface 24cb of the first member first end cap 24c to create the first corner 26. Further when assembled (FIGS. 1 and 5), the second member 40 may be described as substantially overlapping the first member 30 for a distance D, or may alternatively be described as overlapping the entire first member's length. In addition when assembled, the second end cap 24b of the second member 40 extends outwardly from the second end 34 of the head piece 22, lateral surface 22b, or cut lateral surface 70a. Although the severable portions and lines of demarcations are shown in detail in the drawings, it is merely representative of one embodiment, and it is to be understood that there are a variety of shapes, sizes, orientations, constructions, positions, and quantities which may be used and still be within the scope of the teachings herein. For instance, although the cut lines are shown as broken for illustrative purposes of one embodiment in FIG. 3, one or more lines of demarcation or markings may be used to represent a desired length of one or more severable portions, members, or the crosshead structure if a reduction of crosshead length is desired.

In use for installing the crosshead 20 embodiment, the user determines the length required for the crosshead application. If the desired length is determined to correlate to the crosshead length as formed, first length L1 as shown in FIGS. 1 and 2, the user attaches the crosshead 20 as is formed above the window 2 of the building 1. However, if the desired length is other than the formed first length L1, the user will separate the severable portions 50 and 60 from each respective member 30 and 40 as described above thereby reducing the length of the crosshead to a desired second length L2 (FIGS. 3-5). The length of each severable portion removed may be equal to each other, but the lengths may vary depending on the application. The separation of the superfluous material or severable portions 50 and 60 to generate the desired second length L2 of the crosshead 20 may be obtained by, but is not limited to, cutting, breaking, or combinations thereof along the first and second cut lines, 52 and 62 respectively. The first member 30 and second member 40 may be secured to each other and then subsequently attached to the building 1. However, the first member 30 may be secured to the building 1 directly without the second member 40 being first assembled, in doing so the second member 40 would be subsequently attached. A variety of attachments such as, but not limited to, nails, screws, brackets, and adhesive may be used to secure the crosshead 20 to the building or structure, as well as attaching the first and second members to each other. Further cosmetic steps such as, but not limited to, filling attachment holes and contacting surfaces, filling gaps between the assembled first and second members, or painting the crosshead 20 may occur.

It is understood that while certain embodiments of the invention have been illustrated and described, it is not limited thereto except insofar as such limitations are included in the following claims and allowable functional equivalents thereof.

I claim:

1. A method of manufacturing a crosshead comprising the steps of:
   providing one or more mold cavities;
   molding a continuous first member of said crosshead, said continuous first member having an elongated head piece and a first end cap, said head piece having a first end and an opposing second end, wherein said first end cap is disposed at said first end of said head piece;
   molding a continuous second member of said crosshead, said continuous second member having an elongated center cap and a second end cap, said center cap having a first end and an opposing second end, said second end cap is disposed at said second end of said center cap, wherein when said continuous first member and said continuous second member are assembled said first end cap, said second end cap, and said center cap create a trim of said crosshead; and
   reducing an overall length without changing an overall width and an overall depth of an assembly of said continuous first member and said continuous second member by severing a severable portion of said head piece second end from a remaining portion of said continuous first member and severing a severable portion of said center cap first end from a remaining portion of said continuous second member.

2. The method of manufacturing a crosshead of claim 1 wherein the step of severing said severable portion of said center cap first end includes the step of cutting said center cap at an angle relative to a longitudinal axis of said continuous second member.

3. The method of manufacturing a crosshead of claim 1 further comprising the steps of assembling said continuous first member with said continuous second member.

4. The method of manufacturing a crosshead of claim 3 wherein the step of assembling said continuous first member with said continuous second member includes overlaying a portion of said continuous first member and a portion of said continuous second member for a distance.

5. The method of manufacturing a crosshead of claim 1 further comprising the step of injecting one or more materials into said one or more mold cavities.

6. A method of manufacturing a crosshead comprising:
   providing one or more mold cavities;
   positioning one or more materials into said one or more mold cavities;
   molding a continuous first member of said crosshead, said continuous first member having an elongated head piece and a first end cap, wherein said head piece has a first end and an opposing second end along a first longitudinal axis, wherein said first end cap projects from said first end of said head piece and is transverse to said first longitudinal axis of said head piece;
   molding a continuous second member of said crosshead, said continuous second member having an elongated center cap and a second end cap, wherein said center cap has a first end and an opposing second end along a second longitudinal axis, said second end cap projects from said second end of said center cap and is transverse to said second longitudinal axis; and
   wherein the step of molding said continuous first member includes molding an angled surface on said first end cap, wherein said angled surface faces a front surface of said head piece; and
   wherein the step of molding said continuous second member includes molding an angled surface on said first end of said center cap, wherein said angled surface of said center cap first end engages said angled surface of said first end cap when said continuous first member and said continuous second member are assembled.

7. The method of manufacturing a crosshead of claim 6 further comprising the steps of reducing an overall length by severing a severable portion of said head piece second end from a remaining portion of said continuous first member and severing a severable portion of said center cap first end from a remaining portion of said continuous second member.

8. The method of manufacturing a crosshead of claim 7 wherein the step of severing said severable portions from respective said remaining portions occurs at different angles relative to each respective first longitudinal axis and said second longitudinal axis.

9. The method of manufacturing a crosshead of claim 6 further comprising the step of assembling said continuous first member and said continuous second member, wherein the step of assembling said continuous first member with said continuous second member includes overlaying a portion of said continuous first member and a portion of said continuous second member for a distance.

* * * * *